(12) United States Patent
Gruell et al.

(10) Patent No.: US 10,718,277 B2
(45) Date of Patent: Jul. 21, 2020

(54) SAFETY SYSTEM FOR ENGINE SHUTDOWN, AND METHODS OF IMPLEMENTING THE SAME

(71) Applicant: Kohler Co., Kohler, WI (US)

(72) Inventors: Jeffery D. Gruell, Belgium, WI (US); Timothy D. Harreld, Hattiesburg, MS (US); Steven H. Dowdy, Hattiesburg, MS (US)

(73) Assignee: KOHLER CO., Kohler, WI (US)

( * ) Notice: Subject to any disclaimer, the term of this patent is extended or adjusted under 35 U.S.C. 154(b) by 186 days.

(21) Appl. No.: 16/055,566

(22) Filed: Aug. 6, 2018

(65) Prior Publication Data

US 2018/0347478 A1 Dec. 6, 2018

Related U.S. Application Data (63) Continuation of application No. 14/965,074, filed on Dec. 10, 2015, now Pat. No. 10,041,421.

(Continued)

(51) Int. Cl.
*F02D 17/04* (2006.01)
*F02P 11/00* (2006.01)
(Continued)

(52) U.S. Cl.
CPC .............. *F02D 17/04* (2013.01); *A01D 34/76* (2013.01); *A01D 34/828* (2013.01); *F02B 77/08* (2013.01);
(Continued)

(58) Field of Classification Search
CPC .......... F02B 77/08; F02D 17/04; F02D 41/22; A01D 34/00; A01D 34/0006
(Continued)

(56) References Cited

U.S. PATENT DOCUMENTS

| 1,951,189 A | 3/1934 | Fogarty, Jr. |
| 3,228,177 A | 1/1966 | Coates |

(Continued)

FOREIGN PATENT DOCUMENTS

| FR | 2679970 | 2/1993 |
| GB | 515213 | 11/1939 |

(Continued)

OTHER PUBLICATIONS

Chinese Office Action/English Translation from corresponding Chinese Application No. CN 010-58793300, dated May 27, 2019, pp. 1-10.

(Continued)

*Primary Examiner* — Erick R Solis
*Assistant Examiner* — Robert A Werner
(74) *Attorney, Agent, or Firm* — The Belles Group, P.C.

(57) ABSTRACT

A method for manufacturing engine powered machinery having a fuel cut functionality to promote more rapid shutdown of the rotating parts of the engine powered machinery. In one aspect, the method is implemented by assembling a wiring harness disposed exclusively on the engine which are configured to simultaneously disable one or more ignition coils and prevent a fuel-air mixer from supplying a mixture of air and fuel to the engine upon activation of a safety switch. In alternate aspects, the method further comprises a stator brake which is activated by the safety switch to provide additional braking torque on the engine. These features bring the machinery to a rapid halt, further enhancing safety.

20 Claims, 9 Drawing Sheets

Related U.S. Application Data (60) Provisional application No. 62/126,351, filed on Feb. 27, 2015, provisional application No. 62/155,707, filed on May 1, 2015.

(51) Int. Cl.

| | | |
|---|---|---|
| *A01D 34/76* | (2006.01) | |
| *A01D 34/82* | (2006.01) | |
| *F02P 3/04* | (2006.01) | |
| *F02P 5/04* | (2006.01) | |
| *F02M 19/00* | (2006.01) | |
| *F02D 37/02* | (2006.01) | |
| *F02B 77/08* | (2006.01) | |
| *F02D 11/10* | (2006.01) | |
| *F02D 41/22* | (2006.01) | |
| *F02D 41/02* | (2006.01) | |
| *F02D 41/04* | (2006.01) | |
| *H02K 7/18* | (2006.01) | |

(52) U.S. Cl.
CPC ............ *F02D 11/107* (2013.01); *F02D 37/02* (2013.01); *F02D 41/221* (2013.01); *F02M 19/00* (2013.01); *F02P 3/04* (2013.01); *F02P 5/045* (2013.01); *F02P 11/00* (2013.01); *F02D 41/021* (2013.01); *F02D 41/042* (2013.01); *F02D 2400/06* (2013.01); *H02K 7/18* (2013.01)

(58) Field of Classification Search
USPC ....... 123/198 D, 198 DB, 198 DC, 397, 360; 56/10.5
See application file for complete search history.

(56) References Cited

U.S. PATENT DOCUMENTS

| | | |
|---|---|---|
| 3,310,937 A | 3/1967 | Smith |
| 3,781,789 A | 12/1973 | Caleskie et al. |
| 3,833,084 A | 9/1974 | Henderson et al. |
| 3,907,060 A | 9/1975 | Burton et al. |
| 3,955,653 A | 5/1976 | Comer |
| 4,029,073 A | 6/1977 | Dey |
| 4,035,994 A | 7/1977 | Hoff |
| 4,394,893 A | 7/1983 | Kronich et al. |
| 4,458,472 A | 7/1984 | Christopherson |
| 4,531,487 A | 7/1985 | Fujikawa et al. |
| 4,757,885 A | 7/1988 | Kronich |
| 4,889,213 A | 12/1989 | Roller |
| 4,979,596 A | 12/1990 | Roller |
| 5,040,644 A | 8/1991 | Turczyn et al. |
| 5,086,890 A | 2/1992 | Turczyn et al. |
| 5,101,802 A * | 4/1992 | Reinhard ................. F02P 11/04 123/179.5 |
| 5,179,920 A * | 1/1993 | Bender ................... F02B 77/08 123/198 DB |
| 5,224,448 A | 7/1993 | Kandler |
| 5,289,903 A | 3/1994 | Nagai et al. |
| 5,301,644 A | 4/1994 | Olmr |
| 5,379,733 A | 1/1995 | Haddick et al. |
| 5,547,039 A | 8/1996 | Berger et al. |
| 5,641,444 A | 6/1997 | Fujikawa et al. |
| 5,784,868 A | 7/1998 | Wadzinski et al. |
| 5,895,338 A | 4/1999 | Miehle et al. |
| 6,095,294 A | 8/2000 | McGourthy, Sr. et al. |
| 6,609,357 B1 * | 8/2003 | Davis ................... A01D 34/006 56/10.2 A |
| 6,640,174 B2 | 10/2003 | Schondorf et al. |
| 6,812,585 B2 * | 11/2004 | Renner ................. F02D 41/042 123/406.14 |
| 6,983,583 B2 | 1/2006 | Bucher |
| 7,003,936 B1 | 2/2006 | Yue et al. |
| 7,076,348 B2 | 7/2006 | Bucher et al. |
| 7,293,397 B2 | 11/2007 | Osborne |
| 7,600,363 B2 | 10/2009 | Porter et al. |
| 8,381,885 B2 | 2/2013 | Huibregtse et al. |
| 2002/0056348 A1 | 5/2002 | Gass et al. |
| 2004/0050355 A1 | 3/2004 | Harris et al. |
| 2007/0125587 A1 | 6/2007 | Tate et al. |
| 2008/0036241 A1 | 2/2008 | Aisenbrey |
| 2015/0007541 A1 * | 1/2015 | Albinger ................ A01D 69/02 56/10.2 A |

FOREIGN PATENT DOCUMENTS

| | | |
|---|---|---|
| GB | 2399391 | 9/2004 |
| JP | S5960044 | 4/1984 |
| JP | S59060044 | 4/1984 |
| RU | 2015355 | 6/1994 |

OTHER PUBLICATIONS

Corresponding European Search Report for EP16153201 dated Jul. 20, 2016. EP.

Corresponding EP Office Action dated Jan. 12, 2018. EP.

Corresponding Chinese Office Action for CN 100022 dated Mar. 30, 2018. CN.

Second CN Office Action and corresponding English Key Points of the Notificaton for Corresponding CN Application No. 201610073448.5, dated Dec. 3, 2018. CN.

"Electrical System Manual", Encore Power Equipment, Encore Manufacturing Co., Inc.

FC Fuel Shutoff Solenoid Modification Repair, Wanderlodge Owners Group Forum, http://www.wanderlodgeownersgroup.com/forums/showthread.php?t=908, Searched for Feb. 12, 2015.

Simple Fuel Kill Switch, Cause for Alarm, http://www.civic-eg.com/causeforalarm/fuel_kill/index.php, search for on Feb. 12, 2015.

Fuel Shut Off Solenoid Replacement, http://www.bearmalarm.com/Documents/fuel_shut_off_solenoid_replacement.html, search for on Feb. 12, 2015.

Painless Performance Products, www.painlessperformance.com, Installation Manual, 1st Edition Mar. 2008.

\* cited by examiner

SAFETY SYSTEM FOR ENGINE SHUTDOWN, AND METHODS OF IMPLEMENTING THE SAME

CROSS-REFERENCE TO RELATED APPLICATIONS

The present application claims the benefit of U.S. patent application Ser. No. 14/965,074 filed Dec. 10, 2015 (now granted as U.S. Pat. No. 10,041,421), which claims priority to U.S. Provisional Patent Application Ser. No. 62/126,351 filed Feb. 27, 2015 and U.S. Provisional Patent Application Ser. No. 62/155,707 filed May 1, 2015, the entireties of which are incorporated herein by reference.

BACKGROUND OF THE INVENTION

The present technology relates to apparatus, systems, and methods for stopping engine rotation to enhance machine safety. The technology, in certain implementations, is directed to engines and equipment incorporating the same.

Small engine shutdown systems on lawn equipment previously existed in a variety of forms, primarily aimed at stopping engine operation when a safety switch is activated. These systems help to prevent operator and bystander injury and potential machine or property damage. Existing systems focused on disconnecting power from the engine's ignition coil to cease firing of the engine cylinders and halt engine rotation. However, larger machines, especially machines with large grass cutting blades, have substantial inertia that makes rapid shutdown difficult. There remains a need for systems which reduce the time between activation of the shutdown switch and the complete cessation of all rotation to further enhance machine safety.

SUMMARY OF THE INVENTION

The present technology is directed to an improved safety system for engine shutdown. In certain lawn and garden equipment, multiple blades are operatively connected to the output shaft of the engine. The output shaft, power transmission components, blades, and all associated rotating components have substantial inertia which must be stopped as quickly as possible in the event of an emergency. Greater inertia results in a greater tendency to run on, and may make it difficult for equipment manufacturers to achieve the desired width of cut or other performance characteristics while still complying with safety requirements for shutdown time. Though conventional systems already ground the ignition coil to prevent further sparking within the combustion chamber, the engine may still retain enough heat to permit auto-ignition. In addition, oil dilution may also occur as a result of fuel being drawn into the combustion chambers during shutdown, which then migrates past the piston rings into the crankcase once the engine has stopped. The present technology addresses these issues by shutting off the fuel supply to the fuel-air mixer. Thus, no fuel is available that can be ignited, preventing unwanted ignition and running-on of the engine. Further enhancements may incorporate a stator brake, which provides a reliable brake requiring no additional mechanical components and further reducing shutdown time of the engine and attached components.

Previous efforts to reduce machine shutdown time for lawn mowers with large blades or multiple sets of blades failed to halt blade rotation as quickly as desired. Grounding the ignition coils effectively stops the engine, but does not prevent auto-ignition of fuel and air. Auto-ignition, otherwise known as dieseling or run-on is a condition in spark ignition gas engines where fuel mixtures drawn into the combustion chamber are ignited by residual heat in the combustion chamber. In addition, grounding the ignition coils can cause undesired oil dilution from unburned fuel migrating into the crankcase.

Further, grounding the ignition coils does not provide any additional braking force on the engine. The engine merely coasts to a stop. It was discovered that disconnecting the fuel supply from the fuel-air mixer reduces the incidence of dieseling, and prevents oil dilution. This effectively reduces shutdown time, thereby enhancing the safety of the machine, which may be a lawn mower with large blades or multiple sets of blades. Yet another aspect of the technology is to locate all control components necessary to cut the fuel supply in an emergency condition on the engine so that no changes to the wiring of the machine are required to implement the system.

In one implementation, an engine powered machine with safety system comprises an engine configured to rotate a shaft coupled to an implement, a fuel-air mixer fluidly coupled to the engine to provide a mixture of fuel and air, an ignition coil operatively connected to the engine to provide a plurality of sparks, a fuel supply fluidly connected to the fuel-air mixer, a fuel solenoid, and a safety switch. The fuel solenoid is operatively connected between the fuel supply and the fuel-air mixer, the fuel solenoid controlling a flow of fuel to the engine. The fuel solenoid is movable between an open position in which fuel flows from the fuel supply through the fuel solenoid to the fuel-air mixer while the engine is in a running state, and a closed position in which the solenoid interrupts fuel flow to the fuel-air mixer while the engine is in an off state. The safety switch is operatively connected to the fuel solenoid and the ignition coil such that, upon activation of the safety switch, the ignition coil is disabled so that it no longer provides the plurality of sparks to the engine and the fuel solenoid moves to the closed position to interrupt the flow of fuel from the fuel supply to the fuel-air mixer.

In another implementation, an engine assembly for powering machinery includes an engine configured to rotate a shaft coupled to an implement, a fuel-air mixer fluidly coupled to the engine to provide a fuel-air mixture, an ignition coil operatively connected to the engine to provide a plurality of sparks, a fuel solenoid, and an engine side wiring harness. The fuel solenoid is operatively connected to the fuel-air mixer, the fuel solenoid controlling a flow of fuel to the engine. The fuel solenoid is movable between an open position in which fuel flows through the fuel solenoid to the fuel-air mixer while the engine is in a running state, and a closed position in which the fuel solenoid interrupts fuel flow to the fuel-air mixer while the engine is in an off state. The engine side wiring harness is coupled to the engine and operatively connected to the ignition coil and the fuel solenoid. The engine side wiring harness is configured to receive a safety switch activated signal from the machinery. Upon receipt of the safety switch activated signal, the ignition coil is disabled so that it no longer provides the plurality of sparks to the engine and the fuel solenoid moves to the closed position to interrupt the flow of fuel to the fuel-air mixer.

In yet a further implementation, an engine powered machine with safety system comprises an engine configured to rotate a shaft coupled to an implement, a fuel-air mixer fluidly coupled to the engine to provide a mixture of fuel and air, a fuel supply fluidly coupled to the fuel-air mixer, a fuel solenoid, a plurality of permanent magnets, a stator winding, and a safety switch. The fuel solenoid is operatively connected to the fuel-air mixer, the fuel solenoid controlling a flow of fuel to the engine. The fuel solenoid is movable between an open position in which fuel flows through the fuel solenoid to the fuel-air mixer while the engine is in a running state, and a closed position in which the fuel solenoid interrupts fuel flow to the fuel-air mixer while the engine is in an off state. The plurality of permanent magnets is coupled to the shaft of the engine. The stator winding is mounted to the engine in a fixed position and positioned adjacent to the plurality of permanent magnets such that a current is induced in the stator winding when the shaft of the engine rotates. The safety switch is operatively connected to the fuel solenoid and the stator winding. When the safety switch is activated, the stator winding is short circuited to produce a braking torque on the shaft and the fuel solenoid moves to the closed position to interrupt the flow of fuel from the fuel supply to the fuel-air mixer.

In another implementation, a method of manufacturing an engine powered machine includes first providing an engine unit. The engine unit has an engine with a shaft, a fuel-air mixer, an ignition coil, a fuel solenoid, an engine side wiring harness, and a first coupler. The fuel-air mixer is fluidly coupled to the engine and provides a mixture of fuel and air. The ignition coil is operatively connected to provide a plurality of sparks to the engine. The fuel solenoid is operatively connected to the fuel-air mixer to control fuel flow to the fuel-air mixer and is movable between an open position which permits fuel flow and a closed position which prevents fuel flow. The engine side wiring harness is coupled to the engine and operatively connected to the ignition coil and the fuel solenoid. The first coupler is also operatively connected to the engine side wiring harness. Second, a machine is provided, the machine having a chassis, a safety switch, a working tool comprising a shaft, a fuel supply, a machine side wiring harness, and a second coupler. The fuel supply, working tool, and machine side wiring harness are coupled to the chassis and the machine side wiring harness is operatively connected to the safety switch and the second coupler. Third, the engine unit is coupled to the chassis of the machine. The coupling includes operatively connecting the fuel supply to the fuel solenoid, coupling the engine to the chassis and the shaft of the engine to the shaft of the working tool, and coupling the first coupler to the second coupler.

In yet another implementation, a method of shutting down an engine powered machine includes a first step of providing a machine. The machine has an engine unit in a running state, the engine unit having an engine, a fuel-air mixer, an ignition coil, a fuel solenoid, an engine side wiring harness, and a first coupler. The engine has a shaft. The fuel-air mixer is fluidly coupled to the engine to provide a mixture of fuel and air. The ignition coil is operatively connected to the engine to provide a plurality of sparks. The fuel solenoid is operatively connected to the fuel-air mixer to control fuel flow to the fuel-air mixer, the fuel solenoid being movable between an open position in which fuel is free to flow through the fuel solenoid and an open position in which the fuel solenoid prevents fuel flow through the fuel solenoid. The engine side wiring harness is coupled to the engine and operatively connected to the ignition coil and the fuel solenoid. The first coupler is operatively connected to the engine side wiring harness. The machine further includes a chassis, an engine side wiring harness, a safety switch, and a second coupler. The engine unit is coupled to the chassis, the engine side wiring harness is coupled to the chassis and operatively connected to the safety switch and the second coupler, and the second coupler is operatively connected to the first coupler. A fuel supply is coupled to the chassis and operatively connected to the fuel solenoid. A working tool comprising a shaft is provided, the shaft of the working tool being operatively coupled to the shaft of the engine. Second, the safety switch is activated. This generates a safety switch activated signal. Third, in response to the safety switch activated signal, power is removed from the fuel solenoid and the ignition coil is disabled. The power is removed from the fuel solenoid and the ignition coil is disabled simultaneously. The fuel solenoid then moves from the open position to the closed position and the ignition coil no longer provides the plurality of sparks to the engine. The engine unit then transitions from the running state to a shutdown state.

Further areas of applicability of the present technology will become apparent from the detailed description provided hereinafter. It should be understood that the detailed description and specific examples, while indicating the preferred implementation, are intended for purposes of illustration only and are not intended to limit the scope of the technology.

BRIEF DESCRIPTION OF THE DRAWINGS

The present technology will become more fully understood from the detailed description and the accompanying drawings, wherein.

DETAILED DESCRIPTION

The following description of the preferred implementation(s) is merely one example and is in no way intended to limit the technology, its application, or uses.

The description of illustrative implementations according to principles of the present technology is intended to be read in connection with the accompanying drawings, which are to be considered part of the entire written description. In the description of the preferred implementations of the technology disclosed herein, any reference to direction or orientation is merely intended for convenience of description and is not intended in any way to limit the scope of the present technology. Relative terms such as "lower," "upper," "horizontal," "vertical," "above," "below," "up," "down," "left,"

"right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the technology are described by reference to the preferred implementations illustrated herein. Accordingly, the technology expressly should not be limited to such preferred implementations, even if indicated as being preferred. The discussion herein describes and illustrates some possible non-limiting combinations of features that may exist alone or in other combinations of features. The scope of the technology is defined by the claims appended hereto.

Modern lawn care equipment, such as without limitation lawn mowers, are often powered with spark ignition gasoline engines. Spark ignition engines utilize individual sparks to ignite a mixture of fuel and air which is drawn into a combustion chamber of the engine. Each charge of fuel and air is ignited at the appropriate point in the combustion cycle, causing the engine to rotate a shaft which may be attached to an implement to perform some task. When no spark is provided, the engine will eventually cease running and coast to a stop. During this shutdown period, if fuel is supplied to the engine, fuel drawn into the engine may auto-ignite due to the residual heat in the combustion chamber. This will provide additional rotational energy to the engine, causing the shaft to continue turning. Alternate terms for this are "run-on" or "dieseling" because it operates without a spark to ignite the mixture. Though efforts have been made to reduce dieseling or run-on resulting from auto-ignition in spark ignition engines, these efforts have overlooked the potential to reduce shutdown times by cutting the fuel supply in response to the activation of a safety switch.

Figure 1:
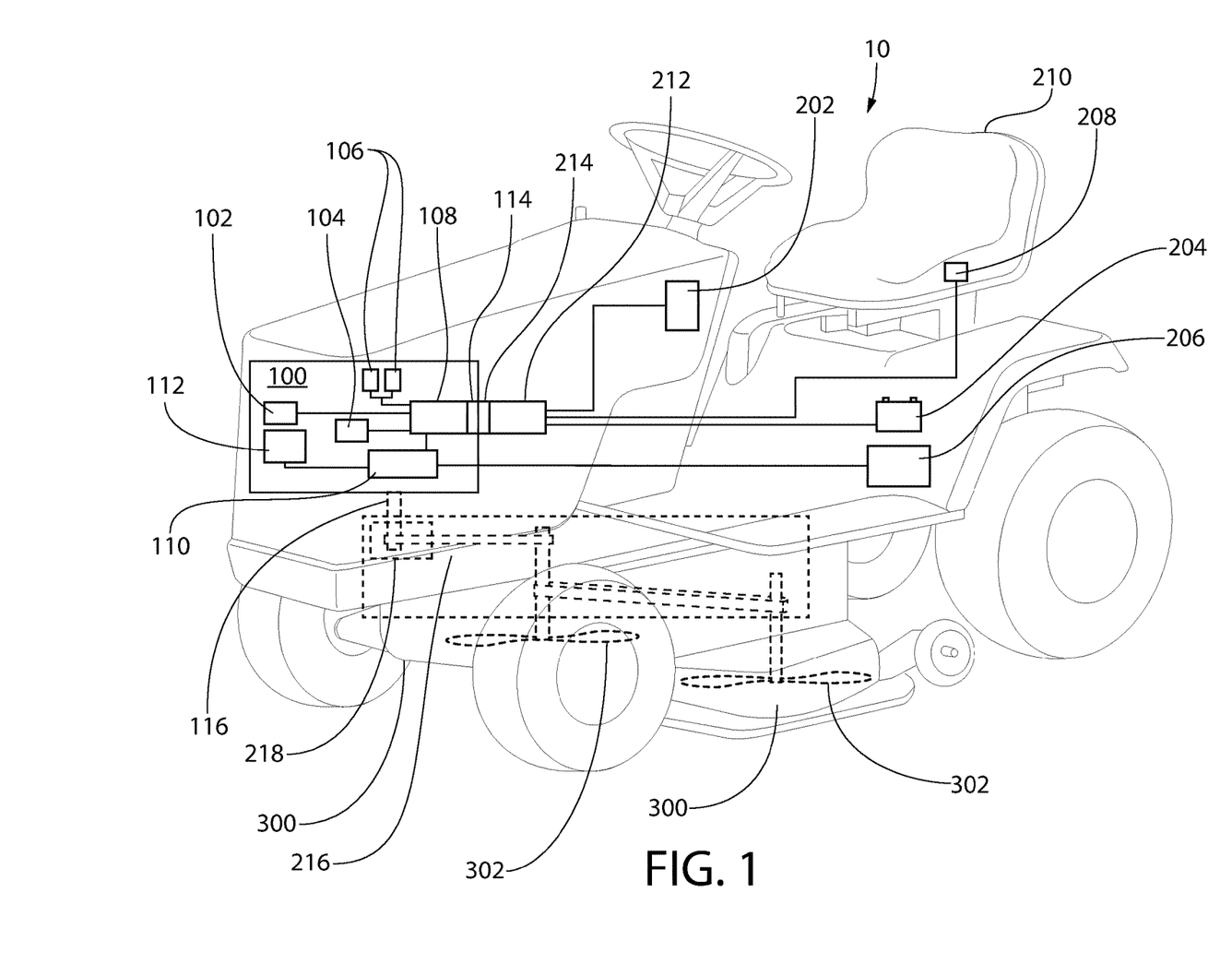
FIG. 1 is a perspective view of a lawn mower showing the safety system in accordance with a first implementation.

FIG. 1 shows a perspective view of a lawn mower with a first implementation of the safety system for engine shutdown. In this implementation, the lawn mower 10 comprises an engine 100, an ignition switch 202, a battery 204, a fuel supply 206, and two working tools 300, a safety switch 208, a seat 210, a machine side wiring harness 212, and a working tool drive 216. The engine 100 includes an alternator 102, a relay 104, two ignition coils 106, an engine side wiring harness 108, a fuel solenoid 110, and a fuel-air mixer 112. These components are all coupled to the engine 100. The engine side wiring harness 108 has a first coupler 114 which operatively connects to the machine side wiring harness 212 via the second coupler 214. The engine side wiring harness 108 is operatively coupled to the alternator 102, the relay 104, the two ignition coils 106, the fuel solenoid 110, and the fuel-air mixer 112. The safety switch 208 is operatively connected to the fuel solenoid 110 and the ignition coils 106 via the connection between the engine side wiring harness 108 and the machine side wiring harness 212.

The engine 100 has an output shaft 116 which operatively connects to the working tool drive 216. The working tool drive 216 provides engine power to the working tools 300 through a power takeoff ("PTO") 218 incorporated into the working tool drive 216. The working tools 300 have blades 302 which perform the grass cutting function. Thus, the engine 100 is configured to rotate the output shaft 116 which is coupled to the working tools 300 via the working tool drive 216. The fuel-air mixer 112 may be any device or combination of devices designed to produce a mixture of air and fuel suitable for combustion and provide that mixture to the engine 100. For instance, it may be a carburetor, a combination of a throttle valve and one or more fuel injectors, a gaseous fuel mixer, or any other system designed to provide a combustible mixture. The fuel need not be added at the same point as any throttle (if equipped), but instead may be injected anywhere along the intake tract leading to the engine 100. Furthermore, the fuel-air mixer 112 may consist of multiple individual injectors and throttle valves in any combination.

The ignition coil 106 may be constructed as a pair of individual windings wound together such that current flows through a primary winding. Upon interruption of this flow of current in the primary winding, the collapsing magnetic field of the primary winding induces a high voltage in a secondary winding, which is ultimately dissipated as a spark when the ignition coil 106 is operatively connected to the engine 100. At the appropriate point in the combustion cycle, the coil 106 provides a spark to the engine 100, causing the mixture of fuel and air that is drawn into the engine 100 to ignite, producing power which may be used to operate the working tools 300. As long as the engine is running, the ignition coil 106 will continue to provide a plurality of sparks to the engine 100. When grounded, the ignition coil 106 will be disabled such that no current flows in the primary winding and no sparks are generated. In some implementations a single ignition coil 106 is used for engines with more than one cylinder, and in other implementations, one or more ignition coils 106 are used per engine cylinder.

The fuel supply 206 may take the form of a tank which stores gasoline. In alternate implementations, the fuel supply may contain other combustible liquids, pressurized gases, or even solid fuels. The fuel supply 206 is mounted to the lawn mower 10 separate from the engine 100. In some aspects, the fuel supply 206 further includes a filter and a pump, the pump pressurizing the fuel to lift it from the tank to the fuel-air mixer 112. The fuel supply 206 is fluidly coupled to the fuel-air mixer 112 to provide a flow of fuel to the engine 100.

The fuel solenoid 110 is operatively connected between the fuel supply 206 and the fuel-air mixer 112 such that the fuel solenoid 110 controls the flow of fuel to the engine 100. The fuel solenoid 110 is a solenoid operated valve that has an open position and a closed position. The open position permits fuel to flow from the fuel supply 206 to the fuel-air mixer 112 whenever the engine 100 is running. The open position also permits fuel to flow when the ignition switch 202 is in the "on" position and the safety switch 208 is not activated. The closed position interrupts fuel flow to the fuel-air mixer 112 when the engine is in an off state.

The lawn mower 10 of the present implementation is typically operated by turning the ignition switch 202 to the "on" position, which provides power from the battery 204 to the relay 104. Once the safety switch 208 is deactivated (i.e. put into the first state), such as by the operator sitting on the seat 210, the relay 104 is deactivated. The safety switch 208 may be put in the first state before or after the ignition switch 202 is turned to the "on" position. When the safety switch 208 is in the first state, power is supplied to both the fuel solenoid 110 and the ignition coils 106. At this time, the ignition switch 202 may be turned to the start position and the engine 100 started. The engine 100 will then continue to run as long as the fuel supply 206 continues to supply fuel to the fuel-air mixer, until the safety switch 208 is activated (i.e. altered to a second state), or until the ignition switch 202 is turned to the "off" position. While the engine is running, the alternator 102 is supplying charging current to the battery 204, and the relay 104 is in a deactivated state. If the operator gets off the seat 210 while the engine is running, the safety switch 208 will activate (i.e. be altered to the second state). As a result, the ignition coils 106 will be actively grounded and the relay 104 will be activated, thereby disconnecting power from the fuel solenoid 110. As a result, the fuel solenoid 110 will move to the closed position, closing the fuel supply line and cutting off fuel from reaching the fuel-air mixer 112. The engine 100 will stop, and the blades 302 of the working tools 300 will rapidly cease rotating.

In the present implementation, the engine side wiring harness 108 may be exclusively located on the engine 100. The engine side wiring harness 108 is operatively connected to the machine side wiring harness 212, the alternator 102, the relay 104, two ignition coils 106, and the fuel solenoid 110. The engine side wiring harness 108, the alternator 102, relay 104, two ignition coils 106, and the fuel solenoid 110 are all mounted, directly or indirectly, to the engine 100. The engine side wiring harness 108 receives power from the battery 204 and a safety switch activated signal or a safety switch deactivated signal from the machine safety switch 208 via the machine side wiring harness 212. The machine safety switch 208 is operatively connected to the seat 210 and is activated, putting the safety switch 208 into a second state, when an operator gets off of the seat 210. The engine side wiring harness 108 is operatively connected to the ignition coil 106 and the fuel solenoid 110.

The safety switch deactivated signal from the safety switch 208 is pulled up to the machine 10's battery 204 voltage when the safety switch 208 is deactivated, in the safety switch 208's first state. Upon activation, the safety switch 208 is in the second state, which causes the safety switch activated signal to be shorted to ground. When both power from the ignition switch 202 and a safety switch 208 deactivated signal are received from the machine side wiring harness 212, the relay 104 is not activated. This allows current to flow to the fuel solenoid 110, causing the solenoid 110 to open and permit fuel to flow from the fuel supply 206 to the fuel-air mixer 112. In addition, power is provided to the ignition coils 106 when the safety switch 208 is in the first, deactivated state, which permits the engine 100 to run. The engine 100 may be started and run when power and a safety switch 208 deactivated signal are received by the engine 100. Activation of the safety switch 208 on the machine 10 grounds the ignition coils 106 while simultaneously causing the relay 104 to activate, cutting off power to the fuel solenoid 110. This halts all fuel flow from the fuel supply 206. All functions necessary to cut fuel and disable the ignition coils 106 are accomplished by the engine side wiring harness 108, which eliminates the need to design and implement a fuel cut functionality within the machine side wiring harness 212.

Alternate implementations may have one or more than two ignition coils 106. In addition, the engine may utilize a variety of fuel mixing systems for the fuel-air mixer 112, including a carburetor, a fuel injection system, or a gaseous fuel mixer. The safety switch 208 may take a variety of forms, and is not limited to a seat 210 activated switch. It may also be a combination of seat 210 and parking brake switches to prevent the operator from leaving the machine seat 210 when the parking brake is disengaged. Alternately, the safety switch 208 may be operatively connected to an electric clutch for the power takeoff (PTO), or other safety devices appropriate to small engine powered machinery. In other implementations, the relay may be eliminated entirely and power may be supplied to the fuel solenoid 110 when the safety switch 208 is in the inactive state. When the safety switch 208 is activated, the fuel solenoid 110 may be directly grounded from the safety switch 208. Finally, the type and number of the working tools 300 may vary according to the intended application. For instance, the same technology could be applied to wood chippers, augers, tillers, impellers, stump grinders, or other engine powered machinery.

Figure 2:
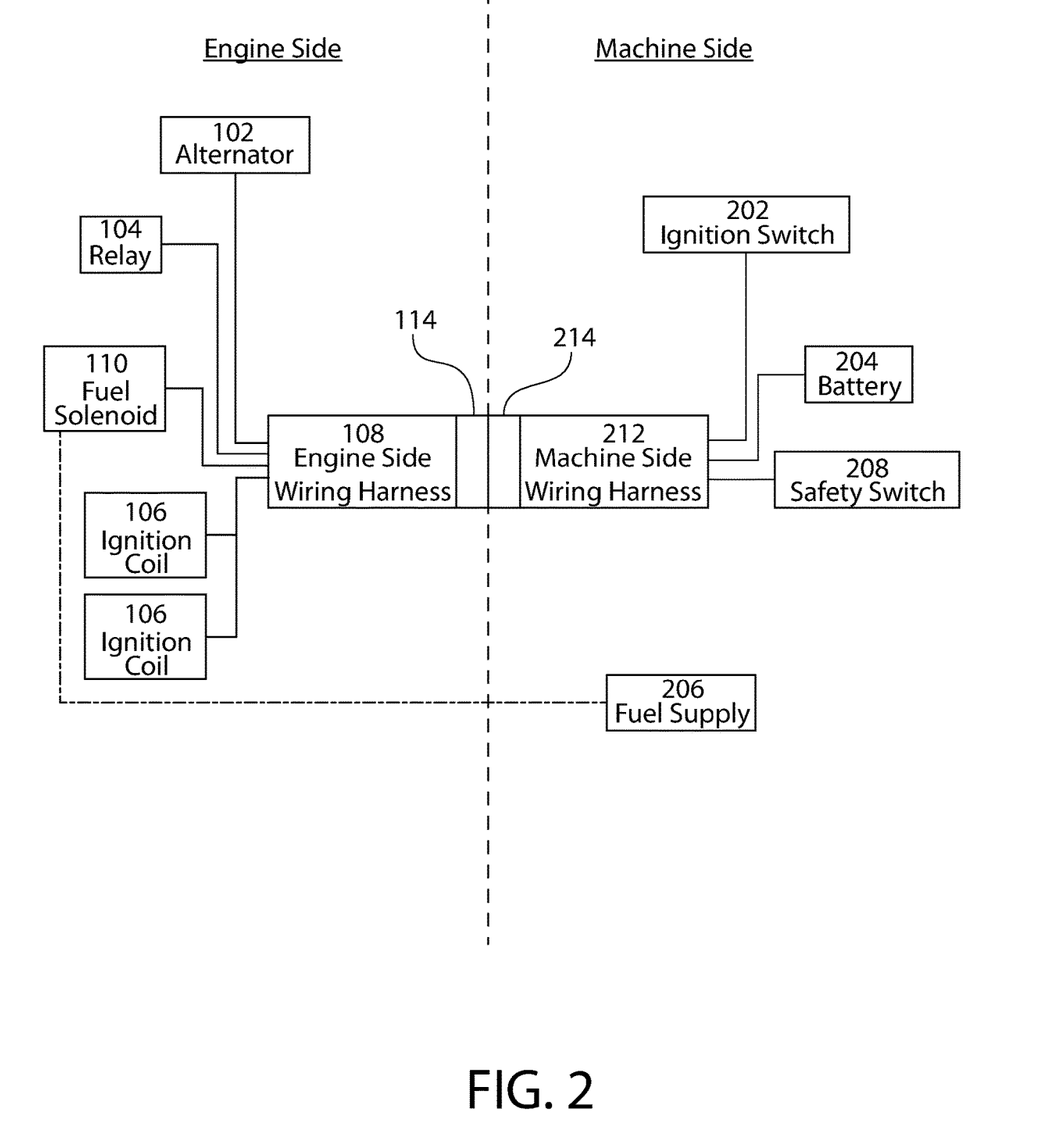
FIG. 2 is a schematic view showing the location of the components of the lawn mower's safety system according to the implementation of FIG. 1.

Turning now to FIG. 2, which shows the arrangement of key components of the safety system of the lawn mower 10 according to the present implementation. As previously described, the alternator 102, relay 104, fuel solenoid 110, ignition coils 106, and engine side wiring harness 108 are all mounted, either directly or indirectly, to the engine 100. The machine side wiring harness 212, ignition switch 202, battery 204, safety switch 208, and fuel supply 206 are all located on the lawn mower 10, but not mounted on the engine 100. In the present implementation, the alternator 102 connects to the engine side wiring harness 108 and provides charging current to the battery 204 via the engine side wiring harness 108, couplers 114, 214 and the machine side wiring harness 212. The relay 104 is also connected to the engine side wiring harness 108, which provides an operative connection between the fuel solenoid 110 and the ignition switch 202, battery 204, and safety switch 208. Finally, the ignition coils 106 receive power through the engine side and machine side wiring harnesses 108, 212 via the couplers 114, 214. The fuel supply 206 has no connection to either the engine side or machine side wiring harnesses 108, 212, having only a fuel supply connection to provide fuel to the fuel solenoid 110.

Figure 3:
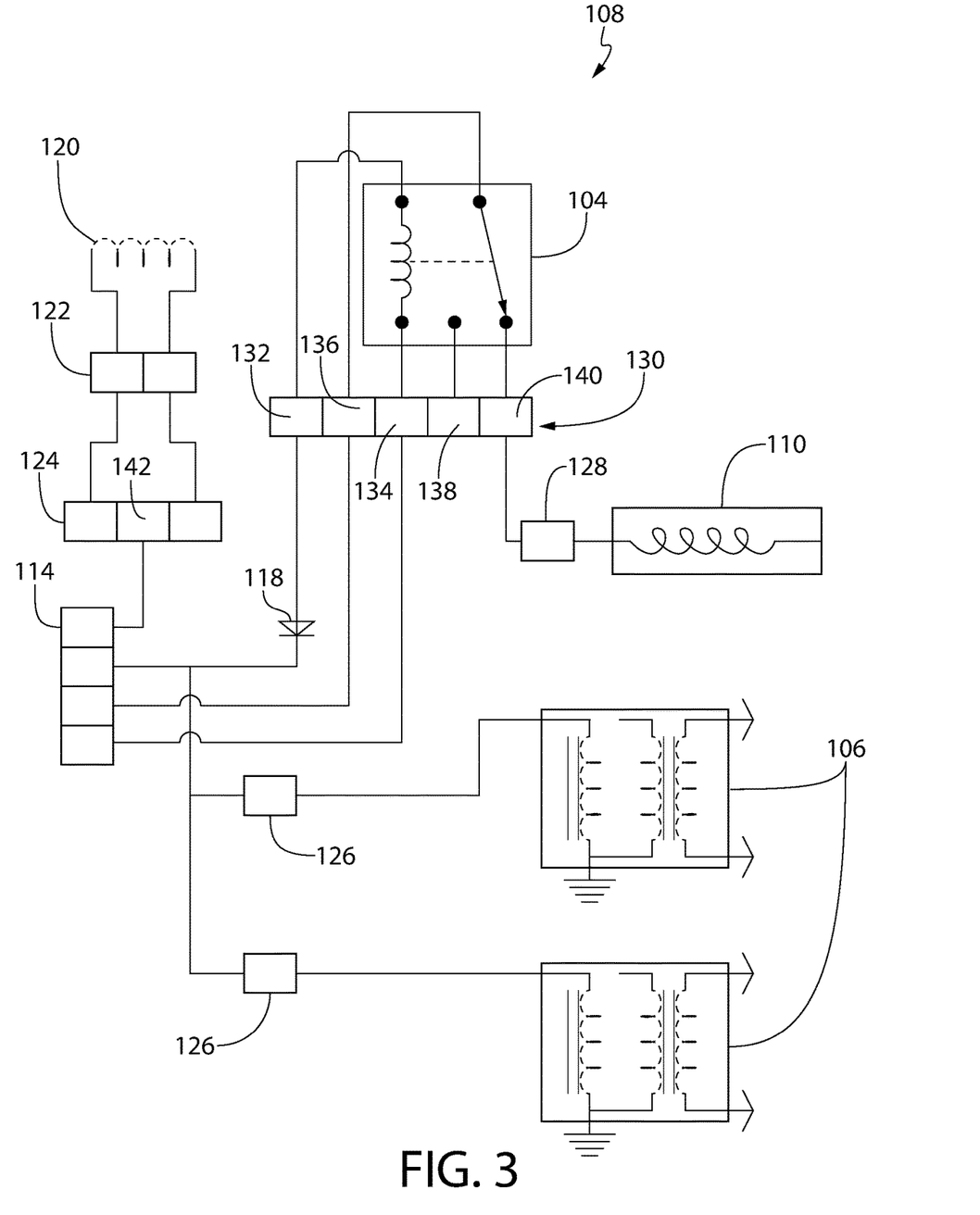
FIG. 3 is a schematic of the engine side wiring harness and the associated engine side components according to the implementation of FIG. 1.
Figure 4:
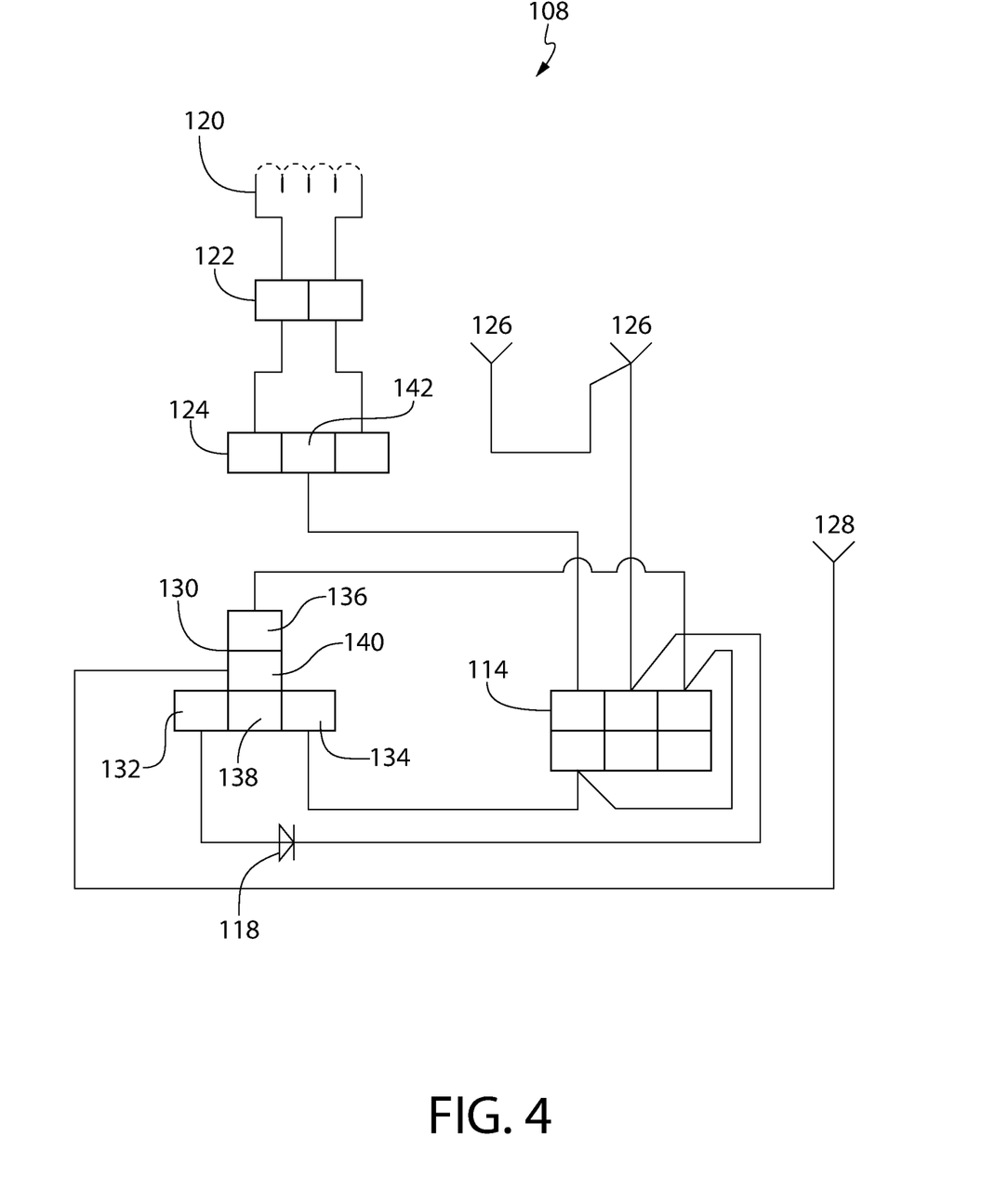
FIG. 4 is a schematic of the engine side wiring harness without any of the associated components according to the implementation of FIG. 1.

FIGS. 3 and 4 show the schematic of the engine side wiring harness 108 according to the present implementation. FIG. 3 shows the engine side wiring harness 108 and the associated components whereas FIG. 4 shows just the engine side wiring harness 108 without the associated components. The first coupler 114 of the engine side wiring harness 108 is operatively connected to alternator charging connector 124, which permits the alternator 102 to supply charging current to the battery 204 via the alternator charging terminal 142. The stator connector 122 is connected to the alternator's stator windings 120, and the stator connector 122 is in turn connected to the alternator connector 124. In the present implementation, no connection is made to the stator windings 120, but it is possible to short the two ends of the stator windings 120 to provide a braking torque to the engine if desired. This may be accomplished through additional circuitry attached to the engine 100, as is described in greater detail below. The first coupler 114 may have any configuration as long as the necessary number of electrical connections can be made. The six pin configuration is preferred as shown in FIG. 4.

The first coupler 114 is further connected to the relay connector 130, which accepts the relay 104. The relay 104 has two coil terminals 132, 134 which can be used to activate the relay 104 when sufficient voltage difference is applied across the two coil terminals 132, 134. Power may be supplied to supply terminal 136. When the relay 104 is not activated, normally closed terminal 140 receives power from supply terminal 136. When relay 104 is activated, normally open terminal 138 receives power from supply terminal 136. As long as power and a safety switch 208 deactivated signal are received at first coupler 114, power is applied to fuel solenoid connector 128, which powers the fuel solenoid 110 and permits fuel flow. A protection diode 118 is installed to prevent unwanted voltage spikes when the relay 104 is activated. Finally, the ignition coils 106 also receive power from the lawn mower 10 via the first coupler 114 when the safety switch 208 deactivated signal is received. The ignition coils 106 are operatively connected via the coil connectors 126 to enhance ease of installation of the coils 106 and the engine side wiring harness 108. If the ignition switch 202 is turned off or the safety switch 208 is activated, power is removed from both the fuel solenoid 110 and the ignition coils 106, rapidly halting engine 100 rotation. The relay connector 130 is preferably configured as a five pin stack like the one shown FIG. 5, but may be in any configuration suitable for making electrical connection to the relay 104.

In a further implementation, the relay 104 and its associated wiring may be eliminated in favor of directly connecting the fuel solenoid 110 to the safety switch 208, which would remove power from the fuel solenoid 110 when the safety switch 208 is activated. This has the advantage of having a minimum complexity and component count.

Figure 5:
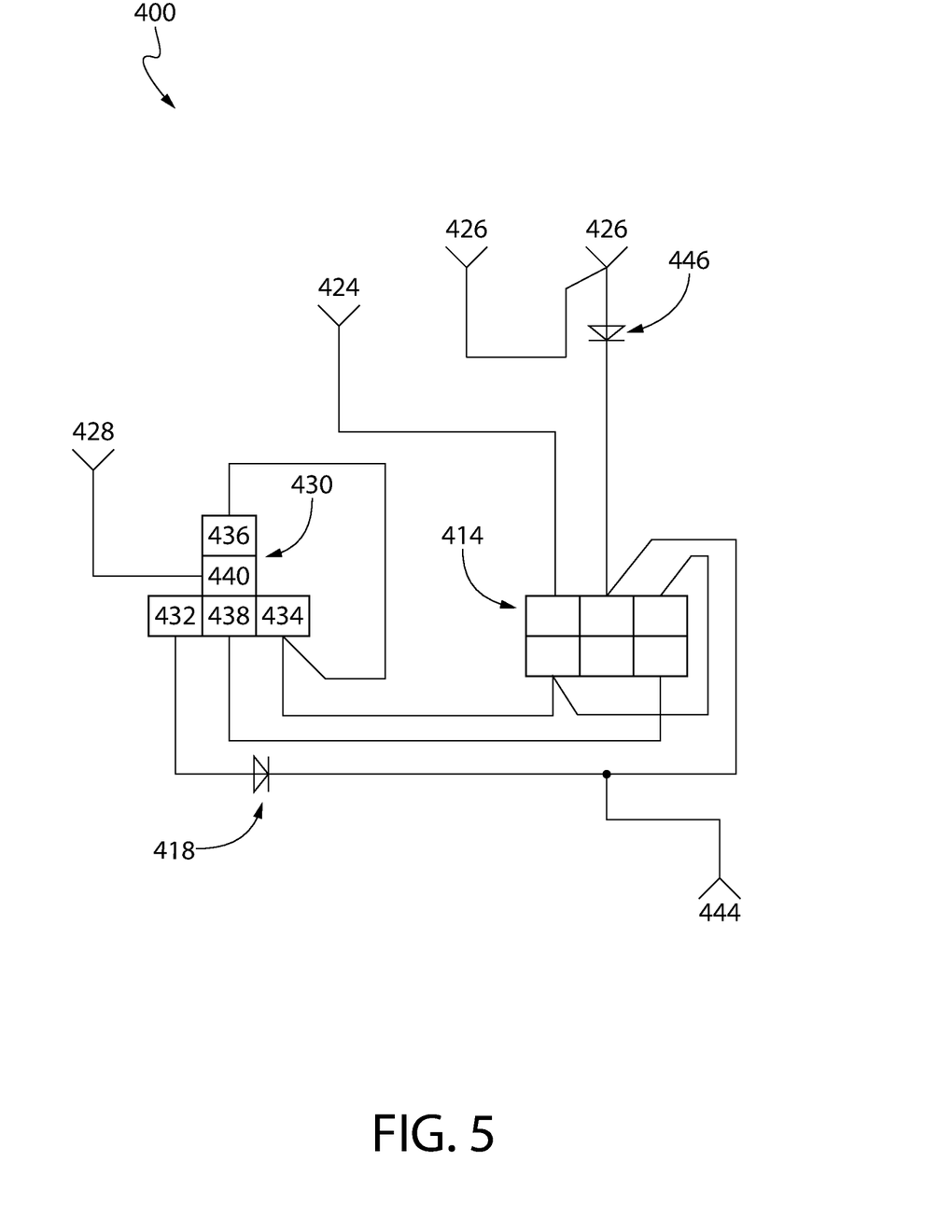
FIG. 5 is a schematic of an alternate implementation of the engine side wiring harness.

FIG. 5 shows an alternate implementation of the engine side wiring harness 400. The first coupler 414 of the engine side wiring harness 400 is operatively connected to alternator charging connector 424, which permits the alternator 102 to supply charging current to the battery 204. The first coupler 414 is further connected to the relay connector 430, which accepts the relay 104. The relay 104 has two coil terminals 432, 434 which can be used to activate the relay 104 when sufficient voltage difference is applied across the two coil terminals 432, 434. Power may be supplied to supply terminal 436. When the relay 104 is not activated, normally closed terminal 440 receives power from supply terminal 436. When relay 104 is activated, normally open terminal 438 receives power from supply terminal 436. Normally open terminal 438 is connected to the first coupler 414 for optional use by accessories on the lawn mower 10.

As long as power and a safety switch 208 deactivated signal are received at first coupler 414, power is applied to fuel solenoid connector 428, which powers the fuel solenoid 110 and permits fuel flow. A protection diode 418 is installed to prevent unwanted voltage spikes when the relay 104 is activated. Finally, the ignition coils 106 also receive power from the lawn mower 10 via the first coupler 414 when the safety switch 208 deactivated signal is received. The ignition coils 106 are operatively connected via the coil connectors 426 to enhance ease of installation of the coils 106 and the engine side wiring harness 400. A DC offset diode 446 is provided in the connection between the first coupler 414 and the coil connectors 426 to eliminate any DC offset for more reliable tachometer operation. The tachometer connector 444 returns an engine speed signal from the engine 100 to the machine side wiring harness 212. If the ignition switch 202 is turned off or the safety switch 208 is activated, power is removed from both the fuel solenoid 110 and the ignition coils 106, rapidly halting engine 100 rotation.

Figure 6:
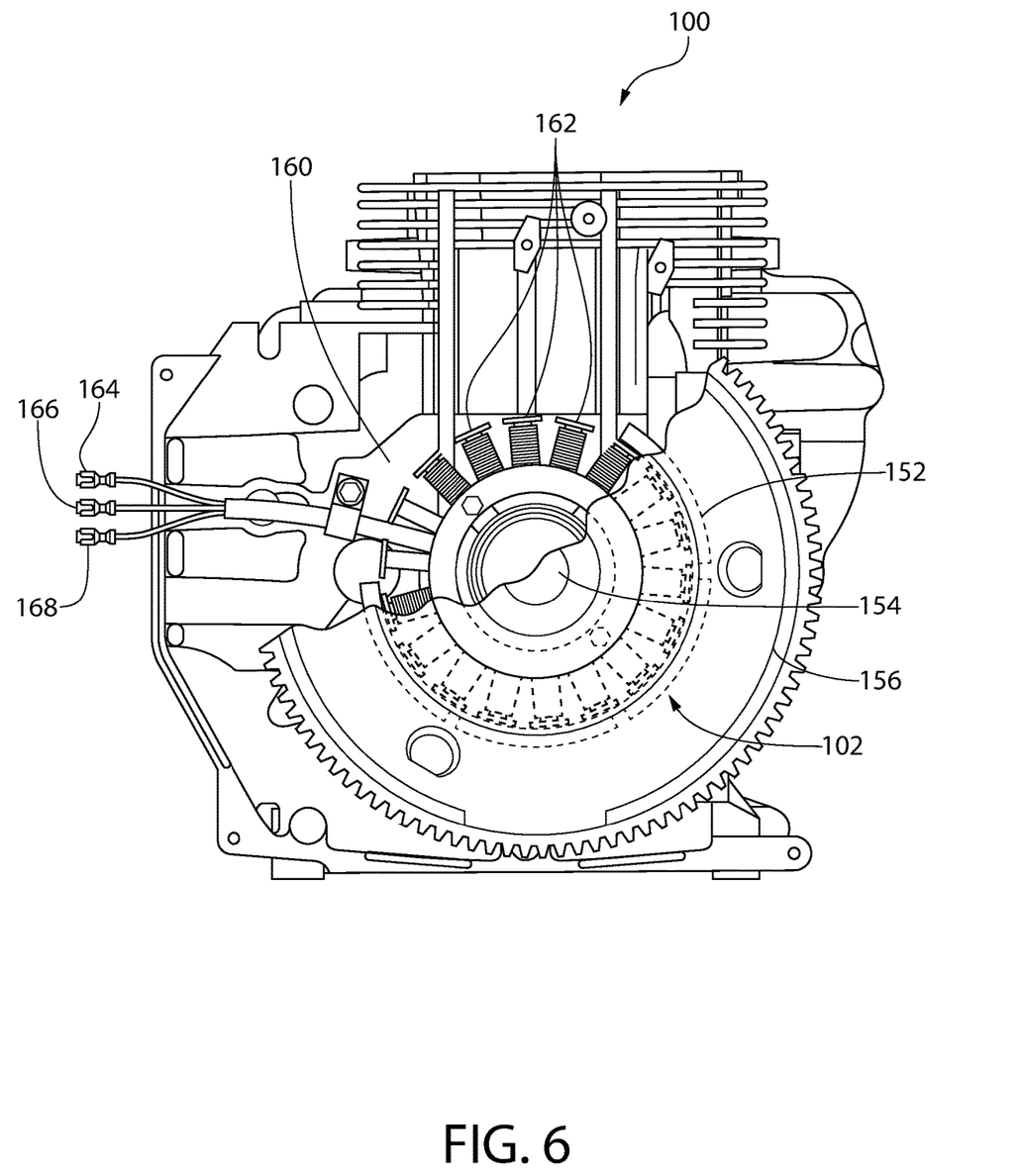
FIG. 6 is a schematic view of an engine, including the alternator.

FIG. 6 shows a schematic view of an internal combustion engine 100 and its alternator 102. The engine 100 rotates a shaft 154 which may be coupled to operate a working tool 300. A flywheel 156 mounts to the shaft 154 and the flywheel 156 supports a ring of permanent magnets 152 that encircle the shaft 154 and face radially inward. A stator assembly 160 is mounted to the engine 100 and is positioned adjacent to and in the same plane as the magnets 152. The stator assembly 160 includes eighteen separate coils 162 that are disposed in a circle around the shaft 154 and spaced equidistantly apart. The coils 162 are connected in series and form a single stator winding 120. In alternate implementations, the number of coils 162 may be varied.

When the engine 100 is operating, the shaft 154 rotates the magnets 152 around the stationary stator assembly 160. An AC current is induced in the stator assembly 160 by its interaction with the changing magnetic field produced by the rotating magnets 152. This same interaction which generates the current in the stator winding 120 also produces a torque on the shaft 154 which opposes its rotary motion. The greater the generated current, the greater this opposing torque.

Figure 7:
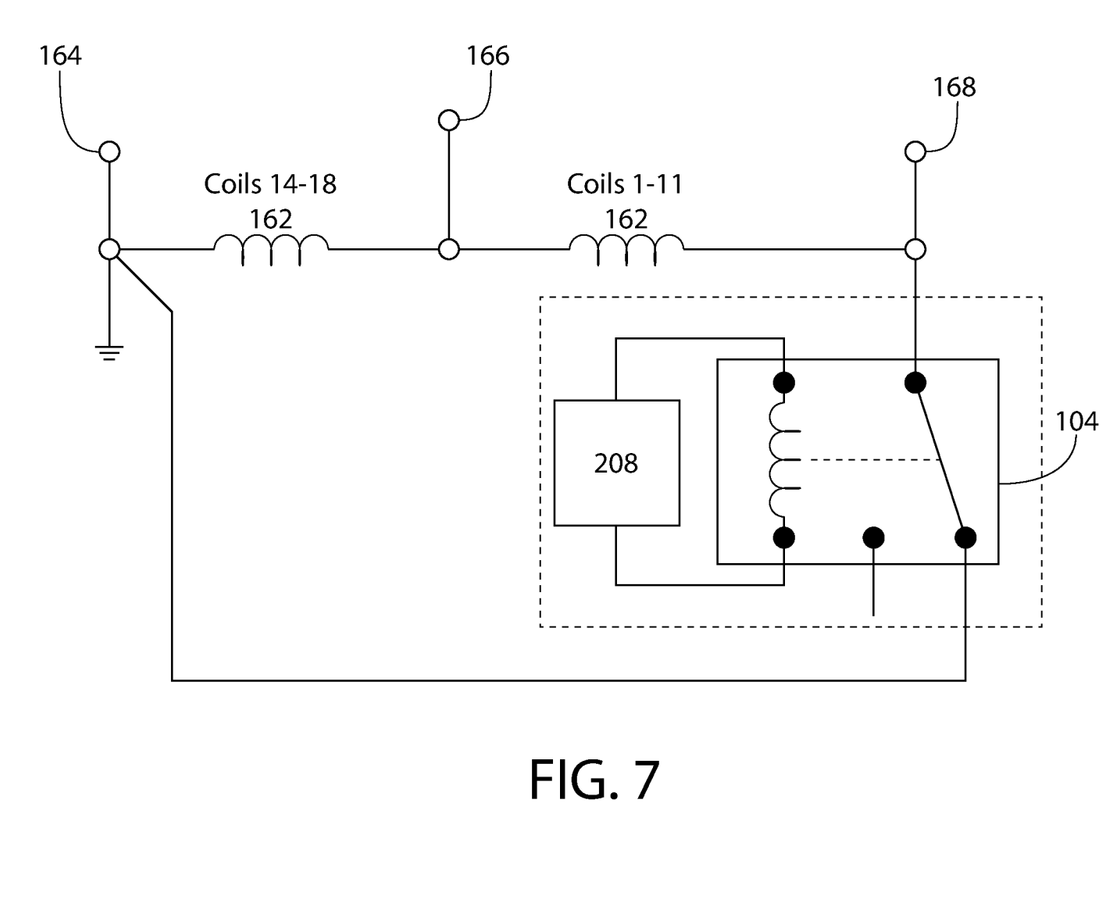
FIG. 7 is a schematic of the electrical wiring of the alternator shown in FIG. 6.

Turning now to FIG. 7, which shows a schematic for an alternator capable of incorporating stator brake functionality. Three leads 164, 166, and 168 are connected to the stator winding. In the present example, the first eleven serially connected stator coils 162 are connected between leads 166 and 168, and the last five serially connected stator coils 162 are connected between leads 164 and 166. The number of stator coils 162 connected between each lead may be varied depending on the application. In some examples, there may be only two leads 164, 168, connected such that all coils 162 are in series and omitting the lead 166 that is connected between the coils 162. Lead 164 is connected to the circuit's ground, generally on the engine. Optionally, lead 164 may be left floating and not connected to ground or may be connected to one of the terminals on the alternator charging connector if the engine side wiring harness is so equipped. Lead 166 is connected to the battery charging terminal 142 of the alternator charging connector 124, as shown in FIG. 3. In other examples, such as that shown in FIG. 5, the alternator charging connector 424 has only one terminal which is connected to lead 166. Finally, lead 168 is optionally connected to another terminal on the alternator charging connector, again if the engine side wiring harness is so equipped. In order to engage a stator brake, leads 164 and 168 are connected together via an optional relay 104, short circuiting the stator winding 120 to produce a braking torque on the shaft 154. This may be done when the safety switch activated signal is received, or in response to another input. Note that the relay 104 and the safety switch 208 are located external to the alternator 102. Connection of the relay 104 and a safety switch 208 are optional, depending on whether a stator brake is desired. Further, these components can be located in a variety of locations and still accomplish the stator braking function.

Figure 8:
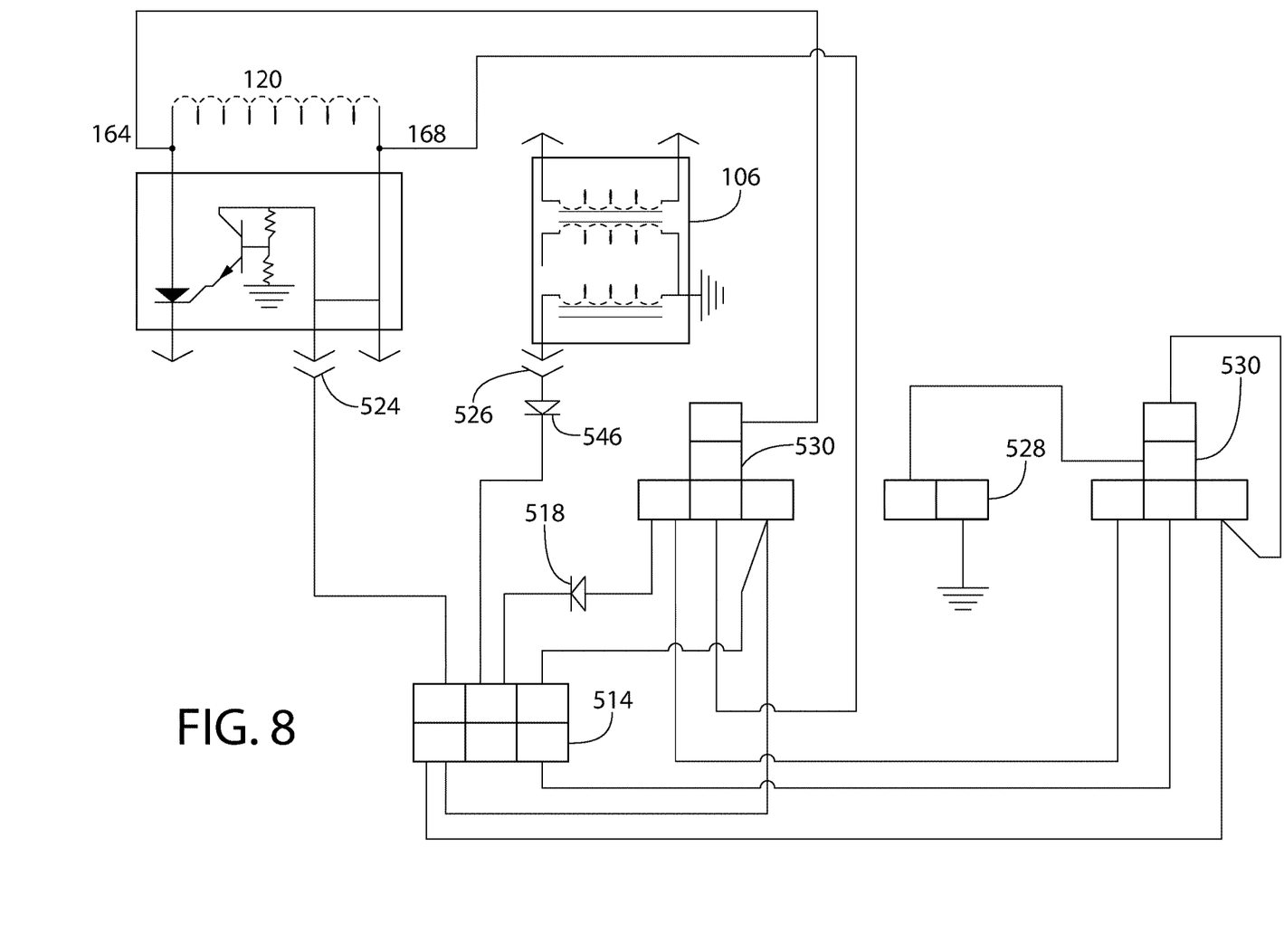
FIG. 8 is a schematic of an engine side wiring harness incorporating both a fuel cut and a stator brake function in a single cylinder engine.

FIG. 8 shows an implementation of the system incorporating both a stator brake and fuel cut functionality. Leads 164 and 168 of the stator winding 120 are connected to the first of two relay connectors 530. When a safety switch activated signal is received from the first coupler 514 a relay 104, which is installed in the first of the two relay connectors 530, is activated and the leads 164 and 168 connected together. When the engine is running, this causes a large current to flow in the stator winding 120 as a result of the relative motion between the stator winding 120 and the magnets 152, producing a braking torque which slows the rotation of the engine 100. The safety switch activated signal also causes the second relay 104 to activate, which disconnects power from the fuel solenoid 110 via the fuel solenoid connector 528 and prevents additional fuel from reaching the engine 100. Finally, the safety switch activated signal removes power from the ignition coil 106 to prevent further sparking.

In the present implementation, battery charging is provided through the alternator charging connector 524. The ignition coil 106 is connected via the coil connector 526, and is further provided with a DC offset diode 546 to eliminate any DC offset for more reliable tachometer operation. Further, a protection diode 518 is installed to prevent unwanted voltage spikes when the relays 104 are activated. The first coupler 514 provides all electrical connections between the engine 100 and the machine side wiring harness 212.

Figure 9:
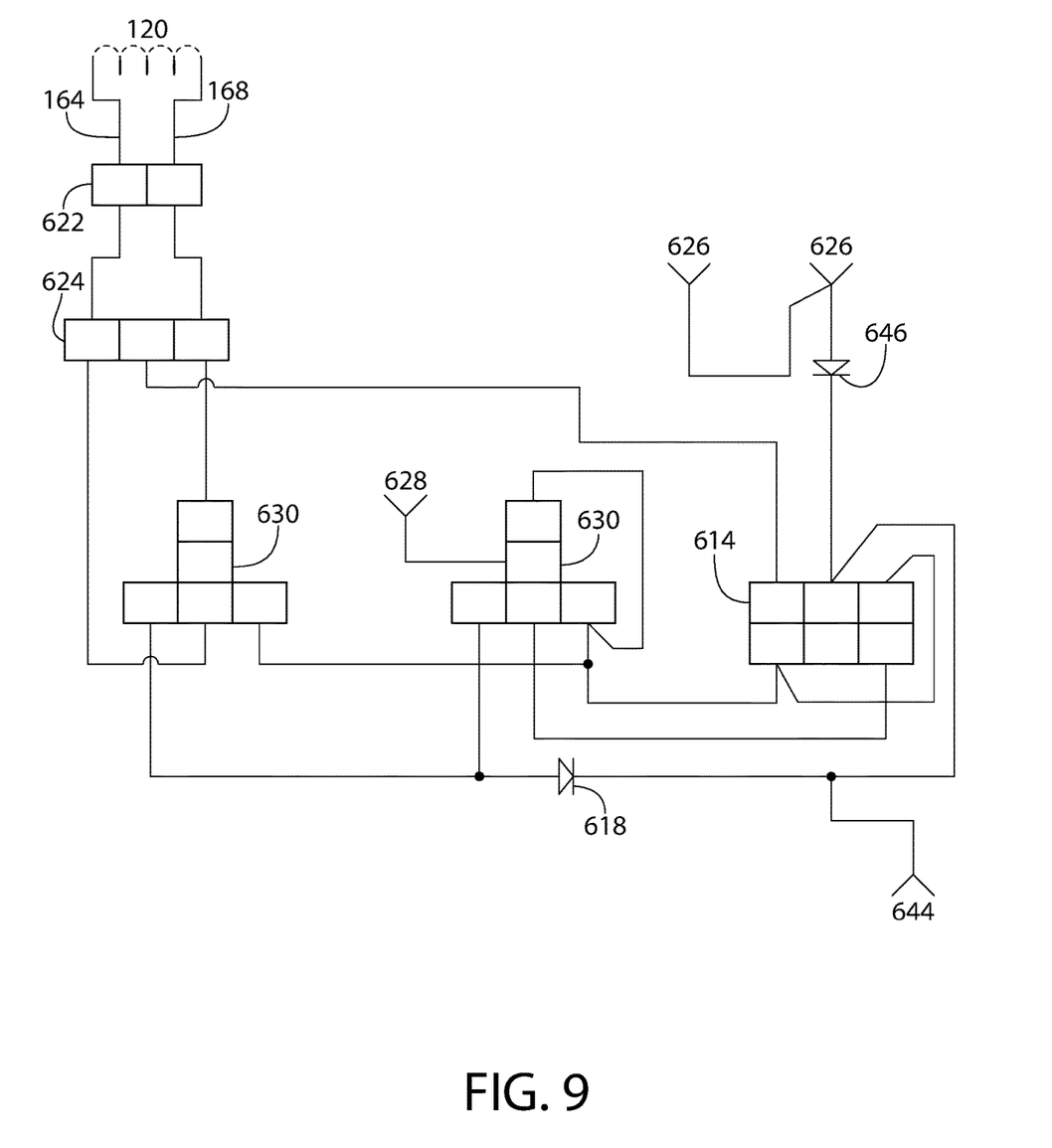
FIG. 9 is a schematic of another implementation of an engine side wiring harness incorporating both a fuel cut and a stator brake function in a twin cylinder engine.

FIG. 9 shows another implementation of the system incorporating both a stator brake and fuel cut functionality. Leads 164 and 168 of the stator winding 120 are connected to the first of two relay connectors 630 via the stator connector 622 and in turn via the alternator charging connector 624. When a safety switch activated signal is received from the first coupler 614 a relay 104, which is installed in the first of the two relay connectors 630, is activated and the leads 164 and 168 connected together. When the engine is running, this causes a large current to flow in the stator winding 120 as a result of the relative motion between the stator winding 120 and the magnets 152, producing a braking torque which slows the rotation of the engine 100. The safety switch activated signal also causes the second relay 104 to activate, which disconnects power from the fuel solenoid 110 via the fuel solenoid connector 628 and prevents additional fuel from reaching the engine 100. Finally, the safety switch activated signal removes power from the ignition coil 106 to prevent further sparking.

In the present implementation, battery charging is provided through the alternator charging connector 624. The ignition coil 106 is connected via the coil connectors 626, and is further provided with a DC offset diode 646 to eliminate any DC offset for more reliable tachometer operation. Further, a protection diode 618 is installed to prevent unwanted voltage spikes when the relays 104 are activated. The first coupler 614 provides all electrical connections between the engine 100 and the machine side wiring harness 212. The tachometer connector 644 returns an engine speed signal from the engine 100 to the machine side wiring harness 212.

Other implementations may also incorporate additional means of stopping engine rotation such as through the friction brake, mechanical brake, damper, or other systems. As noted above, a stator brake may be implemented by connecting the two wires of the stator 120 upon activation of the safety switch 208 to provide additional reduction in shutdown times for the lawn mower 10, or other small engine powered machinery. The relay 104 may also be connected such that the fuel solenoid 110 is powered when the relay 104 is enabled by altering the engine side wiring harness 108. Alternate implementations may accomplish fuel cut and stator braking through the use of a single relay with multiple poles or a single relay wired in an alternate manner, rather than a multiple relays. In addition, more than one relay 104 or multi-pole relays may be used to enable or disable additional brakes or safety devices. In yet other implementations, the safety switch 208 may be a power takeoff (PTO) clutch switch, a combination of the parking brake and seat switches, a dead man switch, or any other system designed to prevent operator injury, property damage, or equipment damage. Alternate implementations may locate the fuel solenoid anywhere on the fuel supply line, as long as the engine side wiring harness powers the fuel solenoid. Though the safety switch 208 has a first state which is deactivated and a second state which is activated, and the relay 104 permits current to flow to the fuel solenoid 110 when the relay 104 is in the inactive state, it is foreseeable that these states may be altered as desired for the specific application. Other variations of these implementations will be apparent to one of skill in the art.

What is claimed is:

1. A method of manufacturing an engine powered machine, the method comprising:
   a) providing an engine unit, the engine unit comprising:
      an engine having a shaft;
      a fuel-air mixer fluidly coupled to the engine to provide a mixture of fuel and air;
      an ignition coil operatively connected to the engine to provide a plurality of sparks;
      a fuel solenoid operatively connected to the fuel-air mixer to control fuel flow to the fuel-air mixer, the fuel solenoid movable between an open position in which fuel is free to flow through the fuel solenoid and a closed position in which the fuel solenoid prevents fuel flow through the fuel solenoid;
      an engine side wiring harness coupled to the engine and operatively connected to the ignition coil and the fuel solenoid; and
      a first coupler, the first coupler operatively connected to the engine side wiring harness;
   b) providing a machine, the machine comprising a chassis, a safety switch, a working tool comprising a shaft, a fuel supply, a machine side wiring harness, and a second coupler, wherein the fuel supply, the working tool, and the machine side wiring harness are coupled to the chassis and the machine side wiring harness is operatively connected to the safety switch and the second coupler;
   c) coupling the engine unit to the chassis of the machine, the coupling comprising:
      operatively connecting the fuel supply to the fuel solenoid;
      coupling the engine to the chassis and the shaft of the engine to the shaft of the working tool; and
      coupling the first coupler to the second coupler.

2. The method of claim 1 wherein the engine unit further comprises a relay coupled to the engine.

3. The method of claim 2 wherein the relay is operatively connected to the fuel solenoid via the engine side wiring harness, the relay alterable between a first state in which the relay supplies power to the fuel solenoid and a second state in which the relay cuts off power from the fuel solenoid, wherein the relay is normally in the first state and is configured to transition from the first state to the second state upon receiving a safety switch activated signal generated by the safety switch.

4. The method of claim 3 wherein the engine unit further comprises:
   a plurality of permanent magnets coupled to the shaft of the engine; and
   a stator winding mounted to the engine in a fixed position and positioned adjacent to the plurality of permanent magnets such that a current is induced in the stator winding when the shaft of the engine rotates;
   wherein upon activation of the safety switch, the stator winding is short circuited to produce a braking torque on the shaft.

5. The method of claim 4 wherein the stator winding comprises a plurality of coils disposed around the engine shaft.

6. The method of claim 4 wherein the engine unit further comprises a second relay, the second relay being operatively coupled to the stator winding via the engine side wiring harness, the second relay alterable between a first state in which the stator winding is not short circuited and a second state in which the stator winding is short circuited by the second relay.

7. The method of claim 1 wherein the first coupler is a multi-pin connector comprising a plurality of terminals.

8. A method of shutting down an engine powered machine, the method comprising:
- a) providing a machine, the machine comprising:
    - an engine unit in a running state, the engine unit comprising:
        - an engine having a shaft;
        - a fuel-air mixer fluidly coupled to the engine to provide a mixture of fuel and air;
        - an ignition coil operatively connected to the engine to provide a plurality of sparks;
        - a fuel solenoid operatively connected to the fuel-air mixer to control fuel flow to the fuel-air mixer, the fuel solenoid movable between an open position in which fuel is free to flow through the fuel solenoid and a closed position in which the fuel solenoid prevents fuel flow through the fuel solenoid;
        - an engine side wiring harness coupled to the engine and operatively connected to the ignition coil and the fuel solenoid; and
        - a first coupler, the first coupler operatively connected to the engine side wiring harness;
    - a chassis, the engine unit coupled to the chassis;
    - a machine side wiring harness coupled to the chassis and operatively connected to a safety switch and a second coupler, the second coupler being operatively connected to the first coupler;
    - a fuel supply coupled to the chassis and operatively connected to the fuel solenoid;
    - a working tool comprising a shaft, the shaft of the working tool being operatively coupled to the shaft of the engine;
- b) activating the safety switch, the safety switch generating a safety switch activated signal
- c) simultaneously removing power from the fuel solenoid and disabling the ignition coil in response to the safety switch activated signal, the fuel solenoid moving from the open position to the closed position and the ignition coil no longer providing the plurality of sparks to the engine, the engine unit transitioning from the running state to a shutdown state.

9. The method of claim 8 wherein the engine unit further comprises a first relay providing power to the fuel solenoid when the engine unit is in the running state and interrupting power to the solenoid upon activation of the safety switch.

10. The method of claim 9 wherein the first relay is coupled to the engine.

11. The method of claim 10 wherein the engine side wiring harness comprises a first relay connector, the first relay connector comprising a first coil terminal, a second coil terminal, a supply terminal, a normally open terminal, and a normally closed terminal.

12. The method of claim 11 wherein the engine side wiring harness further comprises a fuel solenoid connector operatively coupled to the fuel solenoid, the fuel solenoid connector being coupled to the normally closed terminal of the first relay connector of the engine side wiring harness.

13. The method of claim 12 wherein the engine side wiring harness further comprises a protection diode installed between the first coil terminal of the first relay connector and the first coupler.

14. The method of claim 9 wherein the first relay is configured to alternate between a first state in which the relay supplies power to the fuel solenoid and a second state in which the relay cuts off power from the fuel solenoid when the engine unit is in the running state, wherein the first relay is normally in the first state and configured to transition from the first state to the second state upon receiving the safety switch activated signal.

15. The method of claim 8 wherein the first and second couplers are pin connectors.

16. The method of claim 15 wherein the first and second pin connectors each comprise a plurality of terminals.

17. The method of claim 8 wherein the engine unit further comprises:
- a plurality of permanent magnets coupled to the shaft of the engine; and
- a stator winding mounted to the engine in a fixed position and positioned adjacent to the plurality of permanent magnets such that a current is induced in the stator winding when the shaft of the engine rotates;
- wherein step c) further comprises the stator winding being short circuited to produce a braking torque on the shaft.

18. The method of claim 17 further comprising a first relay coupled to the engine, the first relay providing power to the fuel solenoid when the engine unit is in the running state and interrupting power to the solenoid upon activation of the safety switch; and
- a second relay coupled to the engine, the second relay operatively connected to the stator winding such that no current flows through the relay when the engine unit is in the running state and short circuiting the stator winding upon activation of the safety switch.

19. The method of claim 18 wherein the engine side wiring harness comprises a first relay connector, the first relay connector comprising a first coil terminal, a second coil terminal, a supply terminal, a normally open terminal, and a normally closed terminal, the first relay connector coupled to the first relay; and
- wherein the engine side wiring harness comprises a second relay connector, the second relay connector comprising a first coil terminal, a second coil terminal, a supply terminal, a normally open terminal, and a normally closed terminal, the second relay connector coupled to the second relay.

20. The method of claim 19 wherein the stator winding comprises a first lead and a second lead, the first lead coupled to the supply terminal of the second relay and the second lead coupled to the normally open terminal.

* * * * *